United States Patent
Meinsen

(10) Patent No.: US 7,734,665 B2
(45) Date of Patent: *Jun. 8, 2010

(54) SYSTEM AND METHOD FOR PROVIDING DATABASE UTILITIES FOR MAINFRAME OPERATED DATABASES

(75) Inventor: David Meinsen, Independence, MO (US)

(73) Assignee: Embarq Holdings Company, LLC, Overland Park, KS (US)

( * ) Notice: Subject to any disclaimer, the term of this patent is extended or adjusted under 35 U.S.C. 154(b) by 162 days.

This patent is subject to a terminal disclaimer.

(21) Appl. No.: 11/656,591

(22) Filed: Jan. 22, 2007

(65) Prior Publication Data

US 2008/0177798 A1 Jul. 24, 2008

(51) Int. Cl.
*G06F 17/30* (2006.01)
(52) U.S. Cl. .................................. 707/805; 707/804
(58) Field of Classification Search .............. 707/100, 707/102, 200, 202–204; 714/16, 20
See application file for complete search history.

(56) References Cited

U.S. PATENT DOCUMENTS

| | | | |
|---|---|---|---|
| 5,778,387 A * | 7/1998 | Wilkerson et al. | 707/202 |
| 5,857,203 A * | 1/1999 | Kauffman et al. | 707/200 |
| 2004/0250033 A1* | 12/2004 | Prahlad et al. | 711/162 |
| 2005/0240815 A1* | 10/2005 | Purkeypile et al. | 714/15 |
| 2006/0101384 A1* | 5/2006 | Sim-Tang et al. | 717/104 |
| 2006/0236151 A1* | 10/2006 | Costlow et al. | 714/16 |

OTHER PUBLICATIONS

Non-Final Office Action date mailed Jan. 22, 2009 for U.S. Appl. No. 11/656,590.
Response filed Apr. 10, 2009 to Non-Final Office Action date mailed Jan. 22, 2009 for U.S. Appl. No. 11/656,590.
Final Office Action date mailed Jun. 2, 2009 for U.S. Appl. No. 11/656,590.
Amendment after final filed Jul. 20, 2009 for U.S. Appl. No. 11/656,590.
Advisory Action date mailed Jul. 20, 2009 for U.S. Appl. No. 11/656,590.
RCE/Response filed Sep. 2, 2009 for U.S. Appl. No. 11/656,590.
Notice of Allowance date mailed Oct. 1, 2009 for U.S. Appl. No. 11/656,590.

* cited by examiner

*Primary Examiner*—Cam-Linh Nguyen
(74) *Attorney, Agent, or Firm*—Sonnenschein Nath & Rosenthal LLP

(57) ABSTRACT

A system and method for performing database utilities on a database. The system may include a mainframe computer that includes a storage unit and at least one database stored on the storage unit. A processing unit may be configured to receive and schedule jobs submitted for execution. An electronic display may be in communication with the processing unit and execute a software program configured to cause the processing unit to display a menu of selectable utilities on the electronic display, display a utility parameter entry screen in response to receiving a utility selection, and generate information including parameters entered in the utility parameter entry screen for use in performing the selected database utility on the database(s).

20 Claims, 3 Drawing Sheets

```
TSO5 ---------------------- DB2 UTILITIES ON DEMAND ---------------------- DB020P00    200
COMMAND ===>
                   204                            206
    DB2 SUBSYSTEM :  ___              OPTION :  ___
                                                         202
                  DB2    (TSO1)         1 = FIND RECOVERY POINTS
                  DB2F   (TSO1)         2 = RECOVER TABLESPACE
                  DB2R   (TSO4)         3 = BMC IMAGE COPY
                  DB24   (TSO4)         4 = MODIFY UTILITY
                  DB2U   (TSOJ)         5 = RUN STATS
                  DB2    (TSO5)         6 = CHECK DATA
                  DB28   (TSO5)         7 = BMC QUIECE
                  DB2T   (TSO8)         8 = BMC REORG TABLESPACE
                  DB21-DB25 (TSO27)     9 = BMC REORG INDEX
                  DB2C   (TSOM)         A = REBUILD INDEX
                                        B = BIND PLAN OR PACKAGE
                                        C = BMC UNLOAD TABLESPACE
    JOB ACCT       : 7019, TEST____     D = BMC LOAD TABLESPACE
                                        E = START DATABASE
ENTER END COMMAND TO EXIT.              F = REPAIR TABLESPACE
PRESS THE PF1 KEY ON ANY PANEL FOR HELP.  G = CHECK DATA WITH DELETE
```

FIG. 2

```
DB2 ---------------------- FIND RECOVERY POINTS ---------------------- DB2RPI$
COMMAND ===>                                                                       300
                     302
    DATABASE NAME:   _____           (REQUIRED)

TABLESPACE NAME: _____           (BLANK FOR ALL)

SITE:            _____           (LOCALSITE, RECOVERYSITE)

UTPROC:          _____           (BLANK, RESTART, PREVIEW)

UTILITY ID:      _____           (DEFAULT IS USER.JOB)

ENTER END COMMAND TO RETURN.
```

FIG. 3

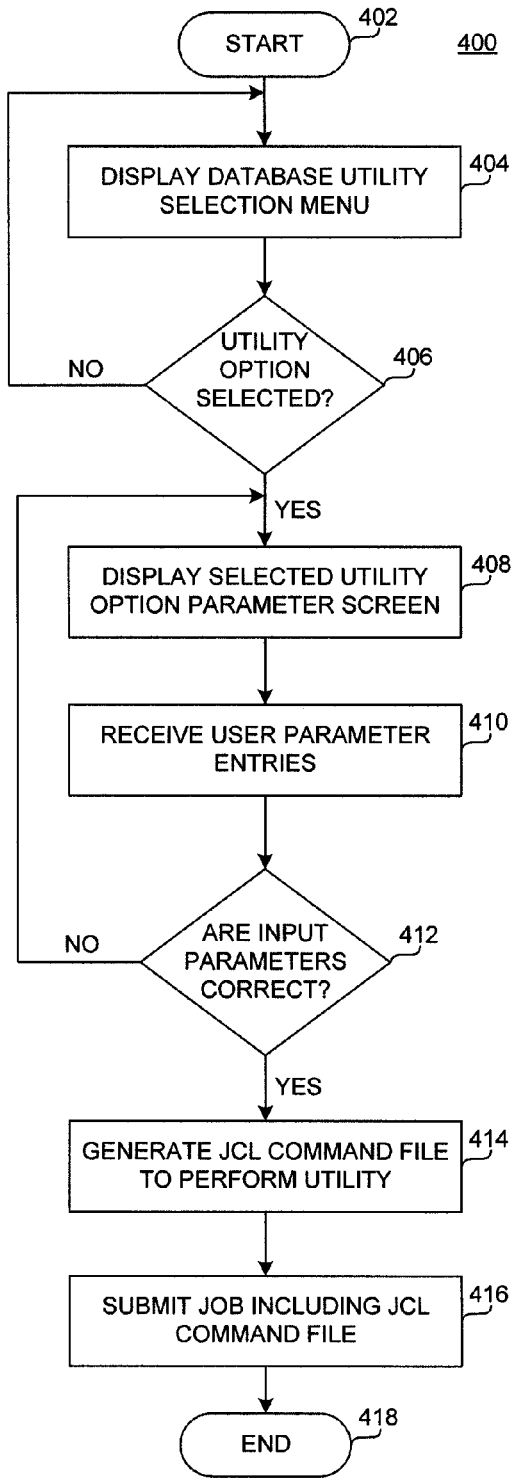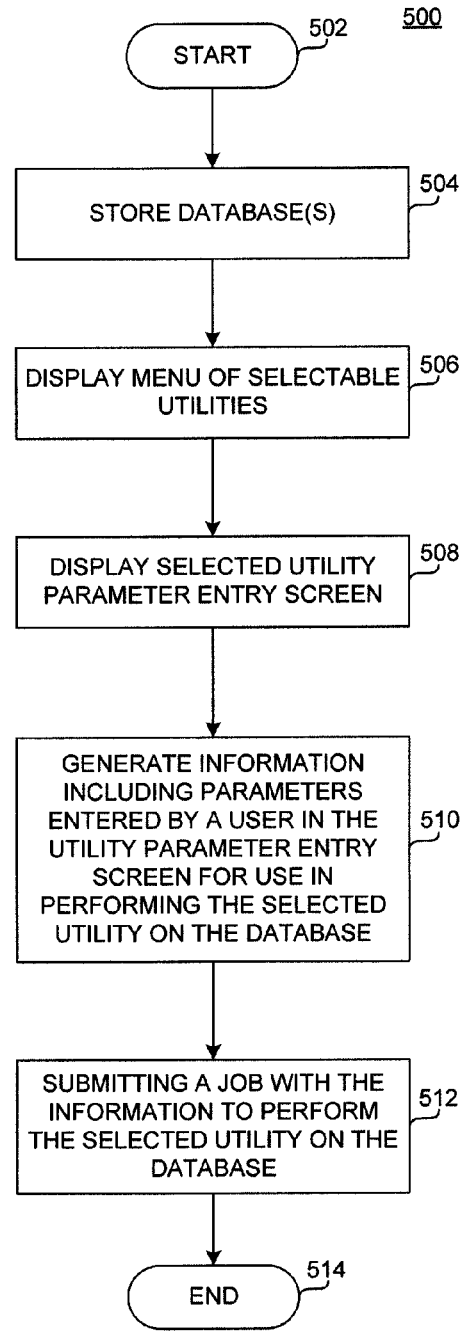
FIG. 4
FIG. 5

SYSTEM AND METHOD FOR PROVIDING DATABASE UTILITIES FOR MAINFRAME OPERATED DATABASES

BACKGROUND

Companies in many different industries handle large database operations using mainframe computers. One such industry is the telecommunications industry, where databases are used to store detailed subscriber records. These databases are large and require routine maintenance to manage them due to a number of reasons, including crashes, updates, corrections, and verifications.

One mainframe manufacturer is International Business Machines (IBM). IBM also provides a database software program known as DB2, which can manage very large databases (e.g., several hundred Gigabytes). As understood in the art, mainframe computers operate by processing jobs that are scheduled in a queue. These jobs are formed by a series of statements or commands that are processed by a processor of the mainframe computer. Jobs are generally statements formatted in the job control language (JCL). Typically, a mainframe computer runs a job by scheduling and executing a file with JCL commands or statements configured for the mainframe computer to perform a task such as re-loading a database from a certain time. In addition to the file with JCL statements, control cards are used to set parameters for the jobs and know the syntax of the control cards. The control cards are typically eighty-byte strings that have each byte and groups of bytes representative of the different parameters. The JCL commands and control cards are comprehensive and generally require well-trained database administrators to adequately generate proper job files and control cards to perform even routine procedures and maintenance on DB2 databases.

To aid database administrators, IBM provides database utilities. These utilities are JCL programs that are configured to perform certain functions. The database administrator, however, must generate a control card for each job. This process is time consuming, costly, and reliant on a limited number of skilled employees. Even with skilled employees, it is not uncommon for run-time errors to be caused by improperly written control cards. The DB2 databases come with a user interface, but the user interface is a single screen that is confusing to skilled database administrators and limited to utilities provided by IBM. Other vendors provide different utility programs, but these, too, require control cards having different formats to be generated by the user. And, the other vendors' utilities have different, similarly complex user interfaces. Another problem that exists with existing utilities provided by IBM and other vendors is the complexity of reports produced by the utilities. The reports generated by current utilities are cluttered, provide too much information, and are generally difficult to interpret.

These and other issues result in significant costs and expenses to staff database operations with database administrators. For example, in a typical telecommunications company, twenty or more database administrators are needed to manage the customer database and support database developers because the database developers are unfamiliar and generally unskilled to generate the necessary database utility operations needed during database development projects and interpret the resulting reports. This number of database administrators is generally needed because of the amount of time needed to generate control cards and set up JCL routines using the utilities available by both IBM and other vendors.

SUMMARY

To overcome the difficulties of using database utilities on mainframes, minimize costs of staffing a database with database administrators, and increase the speed at which utility jobs can be created, the principles of the present invention provide for a system with a utilities menu or panel that is intuitive and provides a user with selectable utilities. In response to a user selecting a utility, a respective utility parameter entry screen is provided to the user for entering parameters to run a utility in a particular manner. Resulting from the utility parameter entry screen, the system generates JCL command files that can be submitted as a job without control cards because the utility parameters entered by the user are embedded within the JCL command files. By providing such intuitive screens, eliminating control cards, and providing easy to read and understand reports, developers may perform utilities on databases with little or no assistance from a database administrator.

One embodiment for implementing the principles of the present invention includes a system for performing database utilities on a database. The system may include a mainframe computer that includes a storage unit and at least one database stored on the storage unit. A processing unit may be configured to receive and schedule jobs submitted for execution. An electronic display may be in communication with the processing unit and execute a software program configured to cause the processing unit to display a menu of selectable utilities on the electronic display, display a utility parameter entry screen in response to receiving a utility selection, and generate information including parameters entered in the utility parameter entry screen for use in performing the selected database utility on the database(s).

A method for performing database utilities on a database may include storing at least one database. A menu of selectable database utilities may be displayed. A utility parameter entry screen may be displayed in response to receiving a database utility selection. Information including parameters entered by a user in the utility parameter entry screen may be generated for use in performing a database utility on the database(s). A job may be submitted with the information to perform the selected database utility on the database(s).

BRIEF DESCRIPTION OF THE DRAWINGS

Illustrative embodiments of the present invention are described in detail below with reference to the attached drawing figures, which are incorporated by reference herein and wherein:

FIG. 2 is a screen shot of an exemplary main menu that provides a user with a list of selectable utility options for performing on databases;

FIG. 3 is a screen shot of an exemplary utility parameter entry screen that enables a user to enter parameters used in performing the selected utility from the main menu of FIG. 2;

FIG. 4 is a flow diagram of an exemplary process for enabling a user to select a utility, submit parameters, and submit a job for a utility to be performed on a database in accordance with the principles of the present invention; and FIG. 5 is a flow diagram of an exemplary process for performing database utilities on a database.

DETAILED DESCRIPTION OF THE DRAWINGS

Figure 1:
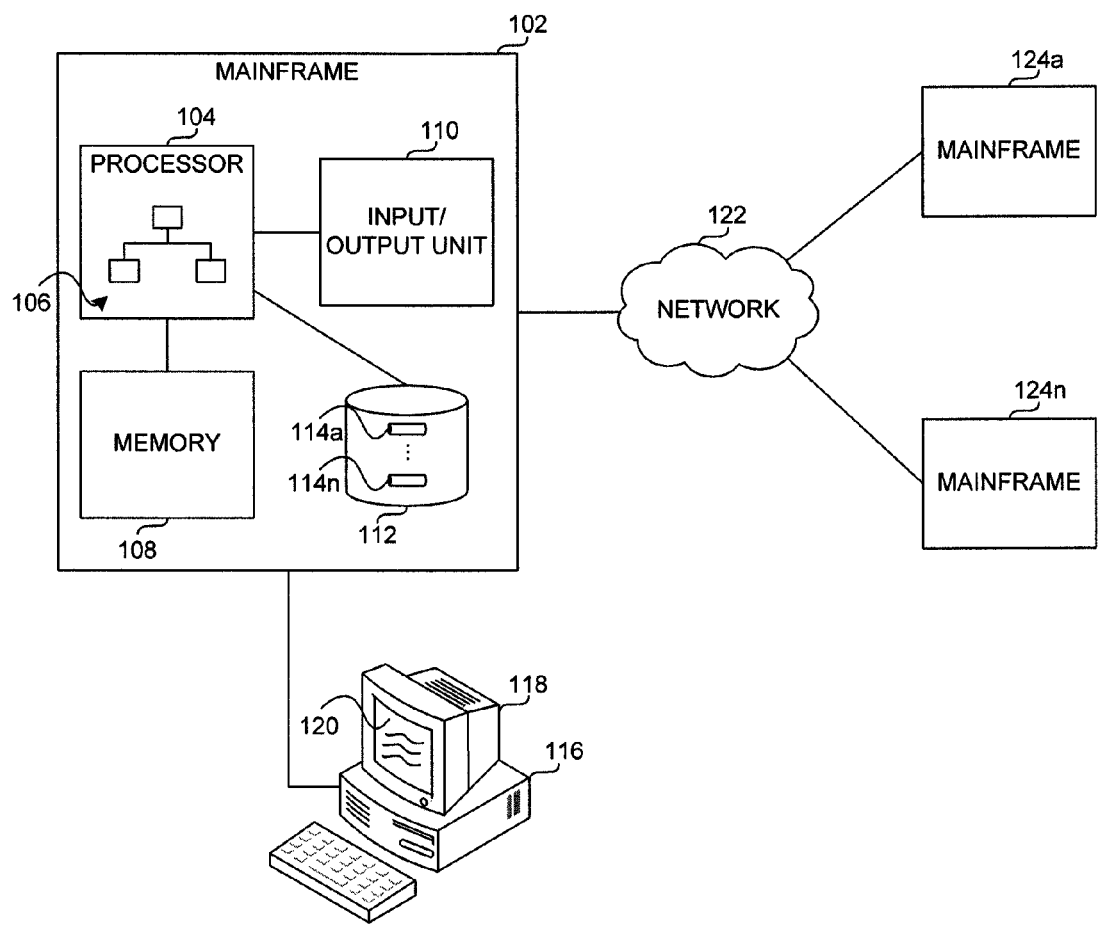
FIG. 1 is an illustration of an exemplary system that includes a mainframe computer on which the principles of the present invention maybe operated.

FIG. 1 is an illustration of an exemplary system 100 that includes a mainframe computer 102 on which the principles of the present invention may be operated. The mainframe computer 102 includes one or more processors 104 that execute software 106. The processor(s) 104 may be in communication with memory 108, input/output (I/O) unit 110, and storage unit 112. The storage unit may store one or more databases 114a-114n (collectively 114). The database(s) 114 may be relational databases or hierarchical databases. In one embodiment, the relational database is a DB2 database produced by IBM. A user interface device 116, such as a terminal, personal computer, or otherwise, may include an electronic display 118 that displays text and/or images 120 thereon. The user interface device 116 may be utilized by a user, such as a database administrator, developer, or otherwise, to interact with the database(s) 114. In addition, the mainframe computer 102 may be in communication with a network 122 to which other mainframe computers 124a-124n (collectively 124) are in communication. These other mainframe computers 124 may be utilized by other parts of a corporation, such as a telecommunications service provider, for storing and operating databases thereon.

In operation, the mainframe computer 102 may execute the software 106 for operating the database(s) 114 stored in the storage unit 112. In the case of the database(s) 114 being DB2 databases, these databases are challenging for users to perform utilities due to confusing user interfaces provided by utility developers, including IBM, and control cards that are difficult to understand even by the most seasoned database administrator. In accordance with the principles of the present invention, the software 106 may include a database utility system that provides intuitive user interfaces that is capable of generating JCL command files that include parameters, thereby eliminating the need for control cards to be used during execution of a job as the parameters entered by a user are included in the JCL command file.

FIG. 2 is a screen shot of an exemplary main menu 200 that provides a user with a list of selectable utility options 202 for performing on a database, such as a DB2 database. The principles of the present invention utilize the DB2 database as an example database, but it should be understood that other relational databases and hierarchical databases operating on a mainframe computer or any other computing system that utilizes jobs to execute functions on databases may utilize the principles of the present invention. As shown, a user may select a DB2 subsystem by entering a subsystem in a text entry field 204 or selecting a DB2 subsystem utilizing a pointing device, such as a computer mouse. A DB2 subsystem is a database that is operating on a mainframe computer either directly or indirectly in communication with the user interface. In other words, the DB2 subsystem may be located over a network on a different mainframe computer for storing information associated with a business operation in a different regional market, for example. The user may select a number of DB2 utility options in the options list 202 by entering information in a text entry field 206. By including the utility options in a list, a user may easily scan the list to determine available options to be utilized in performing utilities on a DB2 database. In response to the user selecting a utility option, a utility parameter entry screen (FIG. 3) may be generated for the user to enter utility parameters for performing the respective utility.

The user may press the PF1 key and receive help. In response to the user pressing the PF1 key, a tutorial page may be generated that includes definitions and/or instructions for the user in selecting a subsystem and utility. For example, in response to the user pressing the PF1 key while viewing the main menu 200, a tutorial page may be generated. The tutorial page may state, This is the main menu for the DB2 Utilities. In order to process a function, you must supply the following information:

| | |
|---|---|
| DB2 Subsystem | This is required and identifies the DB2 Subsystem against which function will be performed. |
| Option | This is required and specifies the function that is to be performed. |
| JOB Acct | This is optional and specifies the account code that is to be used in the job card. Enter your job acct code here. |

Use the DB2JCL$ proc to create production DB2 utility jobs.

FIG. 3 is a screen shot of an exemplary utility parameter entry screen 300 that enables a user to enter utility parameters used for performing the selected utility from the main menu 202 of FIG. 2. As shown, a number of user-input fields 302 are provided for a user to enter the utility parameters. For example, the parameters may include database name, tablespace name (i.e., a table within the database), site, and other parameters used for performing desired utility functions on the selected database. The utility parameters entered by a user are included in a JCL command file to perform a utility function on a database. By including the parameters into a JCL command file, control cards may be eliminated for processing jobs for the selected utilities to be performed on the selected database. After the JCL command file is generated, the user may view the JCL command file and edit it, if desired. However, because the JCL command file is automatically generated, it will execute without error.

Similar to the tutorial page available for the main menu of FIG. 2, a tutorial page may be requested for the Find Recovery Points utility parameter entry screen. Definitions and instructions on the tutorial page may read as follows:

You have chosen to perform the Find Recovery Points function. The following information is needed.

| | |
|---|---|
| Database Name | This is required and is the name of the database. Wildcards can be used in the name. |
| Tablespace Name | This is optional and is the name of the tablespace. If omitted, all table spaces in the database will be processed. |
| Site | This is optional and identifies whether it is to be for LOCALSITE or RECOVERYSITE. The default is LOCALSITE. |
| UTPROC | This is optional and is the utility proc function. The default is blank. Use PREVIEW to preview control cards. Use RESTART if you want to restart the utility. |
| UtilityID | This is optional and is the name of utility id. The default is user.job. |

A report will be created by this job that will show the recovery points for the tablespace.

Continuing with FIG. 2, the list of selectable utility options 202 provided may be software utilities produced by multiple vendors. The utility options that include "BMC" are database utilities provided by BMC Software, Inc., a company that produces database utility software. The utilities without the "BMC" are utilities provided by IBM the developer of DB2. Normally, IBM and BMC provide single-user interfaces that are incapable of showing utilities other than those of the respective utilities developers. In addition, custom database utilities generated by database administrators at the company operating the database may be included in the list of selectable utility options 202 However, in accordance with the principles of the present invention, utilities by both utilities developers maybe displayed and executed from a single menu, such as that shown in FIG. 2. This aggregation of database utilities reduces the amount of time, effort, and knowledge needed to perform utilities on the databases.

FIG. 4 is a flow diagram of an exemplary process 400 for enabling a user to select a utility, submit parameters, and submit a job for a utility to be performed on a database in accordance with the principles of the present invention. The process 400 starts at step 402. At step 404, a database utility selection menu may be displayed. A determination as to whether a utility option has been selected is performed at step 406. If not, the process returns to step 404. If so, the process continues at step 408, where a selected utility option parameter screen is displayed. User parameter entries may be received via the utility option parameter screen at step 410. In response to the parameters being entered, a determination is made at step 412 as to whether the input parameters are correct. In determining whether the input parameters are correct, spelling, syntax, required entries, or other checks on the parameters may be performed. If the parameters are not correct, then the process returns to step 408. Otherwise, the process continues at step 414, where a JCL command file to perform the selected utility is generated. The JCL command file, as previously described, is a set of statements that are used to perform functions of a utility on the selected DB2 database. In addition, the JCL command file includes parameters entered by the user so that control cards are avoided for processing the utility job. By automatically generating a JCL command file with input parameters, JCL and control card errors during execution of a job are avoided, thereby improving efficiency by eliminating debugging of JCL files and control cards. At step 416, the job including the JCL command file maybe submitted as a batch job. The process 400 ends at step 418.

FIG. 5 is a flow diagram of an exemplary process 500 for providing utilities available to be executed to perform utility functions on a database on a mainframe computer. The process 500 starts at step 502. At step 504, one or more databases are stored. The databases may be relational databases or hierarchical databases, as understood in the art. The relational databases may be DB2 databases and the hierarchical databases may be information management system (IMS) databases that are developed by IBN At step 506, a menu of selectable utilities maybe displayed. In response to a user selecting a utility, a selected utility parameter entry screen may be displayed at step 508. The selected utility entry screen may include entry fields by which a user may enter parameters for performing the selected utility. At step 510, information including parameters entered by a user in the utility parameter entry screen for use in performing the selected utility on the database may be generated. In one embodiment, the information may include a JCL command file that includes parameters entered by the user. At step 512, a job with the information to perform the selected utility on the database may be submitted. Because the parameters are included with-the information, a control card is not used during execution of the job, thereby saving time and complexity with performing utilities on the database. The process 500 ends at step 514.

In addition to the principles of the present invention streamlining the process for preparing and using utilities, results of the utilities are provided in an easy to read format. As database administrators have come to realize, reports generated by existing utilities are difficult to read and interpret because they are filled with unnecessary information and have formats that are not conducive to quick analysis and review. These reports can be 60 pages or longer due to the extra information and format. The software 106 of FIG. 1 may include a parsing engine that receives the results of the utility after being executed, parse the information to collect a reduced set of information that is relevant for a user to quickly and easily determine the results of the database utility. The reduced set of results may be included in a table of rows and columns to enable the user to easily scan the results. By generating a table with a reduced set of result information, the number of pages of results may be significantly reduced and the user may more easily review the results.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

What is claimed:

1. A system for performing database utilities on a database, said system comprising:
   a mainframe computer, including:
      a storage unit;
      at least one database stored on said storage unit;
      a processing unit configured to receive and schedule jobs submitted for execution;
      an electronic display in communication with said processing unit; and
      a software program executed by said processing unit and configured to cause the processing unit to:
         display a menu of a plurality of selectable database utilities of different database utility category types on said electronic display;
         display a database utility parameter entry screen in response to receiving a database utility selection; and
         generate information including parameters entered in the database utility parameter entry screen for use in performing the selected database utility on said at least one database.

2. The system according to claim 1, wherein said at least one database is a DB2 database.

3. The system according to claim 1, wherein the generated information enables said processing unit not to have to process a control card to perform a function associated with the selected utility on said database.

4. The system according to claim 1, wherein the software is further configured to enable a user to select a database in which to execute the selected utilities.

5. The system according to claim 4, wherein the database selected is located on a different mainframe computer.

6. The system according to claim 1, wherein the menu of selectable database utilities includes database utilities of multiple database utility developers.

7. The system according to claim 1, wherein the information is formatted in job control language.

8. The system according to claim 7, wherein the software is further configured to submit a job including the information.

9. The system according to claim 1, wherein the software is further configured to generate a report having rows and columns including information representative of results from the selected database utility performed on the at least one database.

10. The system according to claim 9, wherein the software further includes a parsing engine configured to parse data generated by the respective at least one database and collect selected parsed data for inclusion in the report.

11. A method for performing database utilities on a database, said method comprising:
   storing at least one database;
   displaying a menu of a plurality of selectable database utilities of different database utility category types;
   displaying a utility parameter entry screen in response to receiving a database utility selection;
   generating information including parameters entered by a user in the database utility parameter entry screen for use in performing a database utility on the at least one database; and
   submitting a job with the information to perform the selected database utility on the at least one database.

12. The method according to claim 11, wherein storing the at least one database includes storing a DB2 database.

13. The method according to claim 11, wherein generating the information enables not having to process a control card to perform the selected database utility on the at least one database.

14. The method according to claim 11, further comprising enabling a user to select a relational database on which to execute the selected utilities.

15. The method according to claim 14, further comprising enabling the user to select a location at which the selected database is located.

16. The method according to claim 11, wherein displaying a menu of selectable utilities includes displaying database utilities of multiple utility developers.

17. The method according to claim 11, wherein generating information includes generating information formatted in job control language.

18. The method according to claim 11, wherein storing at least one database includes storing databases on multiple mainframe computers.

19. The method according to claim 11, further comprising generating a report having rows and columns of information representative of results from the database utility performed on the at least one database.

20. The method according to claim 19, further comprising:
   parsing data generated by the respective function performed on the at least one database; and
   collecting selected parsed data for inclusion in the report.

* * * * *